United States Patent [19]
Wang et al.

[11] Patent Number: 5,381,824
[45] Date of Patent: Jan. 17, 1995

[54] REGULATOR

[75] Inventors: Yushan Wang, Howell; Wilson Orozco, Freehold, both of N.J.

[73] Assignee: Standard Keil Industries, Inc., Allenwood, N.J.

[21] Appl. No.: 116,004

[22] Filed: Sep. 2, 1993

[51] Int. Cl.6 ............................................. G05D 16/02
[52] U.S. Cl. ...................................... 137/505; 251/112
[58] Field of Search ............ 137/505 I, 505.38, 505.41; 251/112

[56] References Cited

U.S. PATENT DOCUMENTS

| | | | |
|---|---|---|---|
| 2,522,913 | 9/1950 | Westman | 137/505.38 X |
| 2,973,007 | 2/1961 | Schutmaat | 137/505.41 |
| 3,474,822 | 10/1969 | Kuhn et al. | 137/505.41 |
| 3,712,333 | 1/1973 | Semon | 137/505.41 X |
| 4,696,320 | 9/1987 | Bull | 137/505.42 X |
| 4,760,862 | 8/1988 | Mutou et al. | 137/505.42 X |

FOREIGN PATENT DOCUMENTS

| | | | |
|---|---|---|---|
| 192645 | 1/1937 | Switzerland | 137/505 |
| 21491 | of 1907 | United Kingdom | 251/112 |
| 685245 | 11/1952 | United Kingdom | 137/505 |

*Primary Examiner*—Stephen M. Hepperle
*Attorney, Agent, or Firm*—Schweitzer Cornman & Gross

[57] ABSTRACT

A gas regulator has a pressure control diaphragm biased by a spring. The force of the spring upon the diaphragm, and thus the operating pressure for the regulator, is controlled by a linear travel bushing bearing against the spring. The bushing is preferably threaded upon a shaft, the rotation of which allows travel of the bushing. The top end of the shaft is recessed within a bore in the regulator housing to deter tampering. The shaft may be locked in position by use of a recessed setscrew, while the access bore may be provided with a cover.

1 Claim, 1 Drawing Sheet

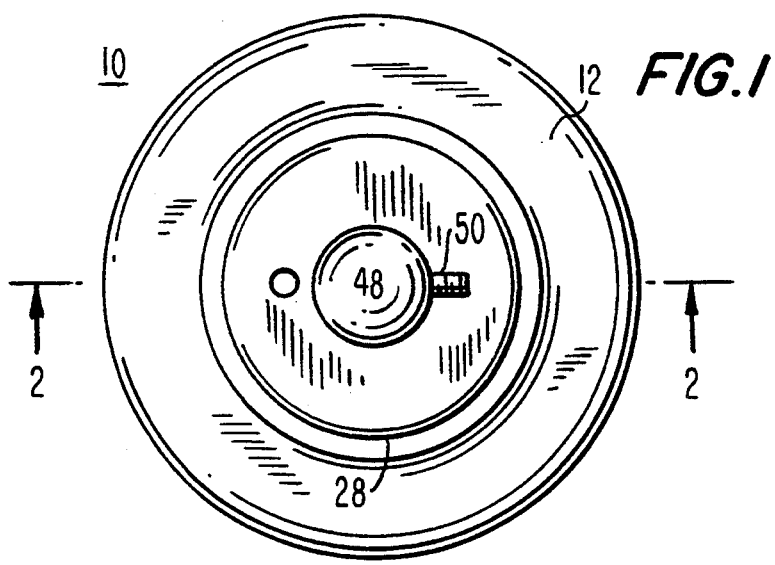
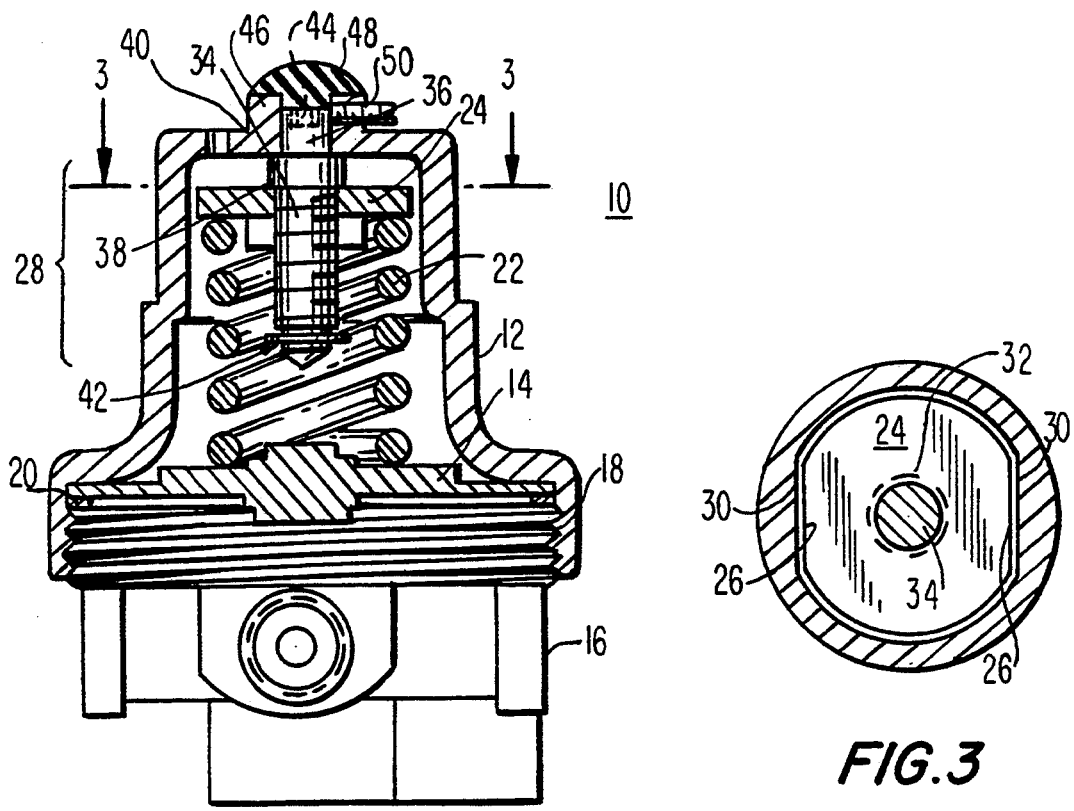

REGULATOR

The present invention relates to a gas regulator and, in particular, to a new and improved regulator which is of economical construction and provides safeguards against tampering.

BACKGROUND OF THE INVENTION

Diaphragm-type gas regulators are well known. Such regulators utilize a spring-biased diaphragm serving as a valve element between portions of the regulator to control the flow and thus the pressure of the gas flowing therethrough. Typically, the amount of tension placed upon the diaphragm by the spring is adjustable, thus allowing the operating pressure of the regulator to be varied. While such adjustability is obviously of great benefit, allowing a stock regulator to accommodate a variety of gas pressure control needs, it also provides an opportunity for unauthorized adjustment and tampering, either by those believing that readjustment will somehow improve the performance of the equipment to which the regulator is attached, or by those whose purpose is more malicious.

Because such regulators are located in a variety of environments and locations, it is desirous to provide a structure which is of simple, yet efficient construction and operation. In addition, it is necessary to insure that the regulator setting as intended for proper operation is maintained and not easily subject to tampering.

It is accordingly a purpose of the present invention to provide a gas regulator construction of simple and efficient construction and operation.

Yet another purpose of the present invention is to provide such a regulator assembly which is resistant to tampering.

BRIEF DESCRIPTION OF THE INVENTION

In accordance with the foregoing and other purposes, the regulator of the present invention includes a housing of generally conventional construction in which a spring biased diaphragm acts as the active, pressure-controlling mechanism. Adjustment of spring tension, and thus the operating pressure for the regulator, is provided by a pressure plate positioned to bear against the spring. Means for varying the position of the pressure plate and thus the compression of the spring is provided. In a preferred embodiment, the plate adjustment means comprises a threaded shaft journaled into the top portion of the regulator housing upon which the plate travels. To provide an anti-tampering construction, the adjustment means is recessed within the housing. When the threaded shaft adjustment means is utilized, its top end, which bears a recess adapted for acceptance of an adjustment tool, is located below the upper surface of the regulator. Locking means are provided to secure the adjustment means in the desired position, and a cap may be provided to cover the exposed end of the adjustment means.

BRIEF DESCRIPTION OF THE DRAWINGS

A fuller understanding of the present invention and its features and benefits will be achieved upon consideration of the following detailed description of a preferred, but nonetheless illustrative embodiment of the invention when reviewed in connection with the annexed drawings, wherein:

FIG. 1 is a top plan view of the regulator of the present invention;

FIG. 2 is an elevation view in section taken along line 2—2 of FIG. 1; and

FIG. 3 is a top plan view in section taken along line 3—3 of FIG. 2.

DETAILED DESCRIPTION OF THE INVENTION

As shown in the Figures, regulator 10 includes a generally bell-shaped upper housing 12 bearing pressure-control diaphragm 14 adapted to operate in the conventional manner to control the flow of gas through the regulator. The upper housing 12 is mounted to the lower regulator body assembly 16 by mating threads at 18. A leak-free construction may be afforded by use of an appropriate gasket 20.

The operating pressure for the regulator is controlled by the downward bias of diaphragm 14, against the flow of gas entering the lower regulator body assembly, as provided by main spring 22. The degree of compression of the spring, and thus the spring force exerted against the diaphragm 14, is controlled by linear travel bushing 24, which bears against the upper end of the spring. As may be best seen in FIG. 3, the bushing 24 is of generally circular configuration, with a pair of opposed parallel flat sides 26. The upper portion 28 of the bell-shaped housing 12 is constructed with a complimentary pair of opposed inner wall surfaces 30 which maintain the orientation of the bushing within the housing and prevent its rotation about a vertical axis.

The bushing 24 is provided with a threaded central throughbore 32 through which mating threaded shaft 34 extends. The shaft 34 extends upwardly into a bore 36 through the top 40 of the housing 12. The shaft 34 is provided with fixed thrust ring 38 which serves as a stop, bearing against the lower surface of the regulator top 40 to prevent the spring forces transmitted to the bushing and shaft from displacing the shaft upwardly.

Because the shaft 34 is constrained against reaction forces from the spring, and bushing plate 24 is prevented from rotating within the housing, rotation of the shaft causes the vertical displacement of the bushing plate 24 threaded thereon upon shaft rotation. Such displacement compresses or relaxes the spring 22, adjusting the regulator reference pressure. To prevent the plate from being threaded off the shaft, a snap ring or washer 42 is mounted at the lower end of the shaft. In order to facilitate adjustment and rotation of the shaft, the upper end of the shaft may be provided with an appropriate adjustment means, such as a tool socket 44, which allows an appropriate adjustment tool, such as a spline wrench, to engage the shaft for adjustment purposes. The choice of a non-standard socket shape can minimize the ability of tampering.

In addition, the upper end of the shaft may be recessed within the extended portion 46 of the regulator top wall which surrounds and defines the shaft-accepting bore therein. Since the adjustment shaft does not project outward beyond the housing top surface, the use of alternative means to grip the shaft, such as pliers, are eliminated. Recessing the shaft also renders the adjustment means less obvious and apparent to the casual observer. A friction-fit rubber plug or cover 48 may be provided to both seal the top end of the bore 36, as well as to further conceal the adjustment shaft. Set screw 50, mounted in an appropriate threaded bore in the wall portion 46, is provided to contact the upper portion of the shaft and, upon tightening, to further lock the shaft in position. While shown in the Figures as extending outwardly beyond the wall 46, the set screw may be of a length such that its head is recessed within its mounting bore to further minimize the risk of unauthorized adjustment.

I claim:

1. A gas regulator, comprising: a housing including a top wall having a bore extending therethrough, said top wall including an upwardly-extending collar portion surrounding said bore, said collar portion having a transverse threaded bore; a gas pressure control diaphragm located within said housing; a shaft within said housing and having an intermediate ring portion dividing said shaft into an upper non-threaded portion and a lower, threaded portion, the upper portion of said shaft extending into said bore and terminating below a top surface of said collar portion; a setscrew mounted in said transverse threaded bore of said collar portion for engagement with said shaft upper portion; a plug having a cap portion dimensioned to cover said top wall bore and a depending portion dimensioned to frictionally engage said top wall bore; a threaded bushing mounted upon said threaded shaft portion for travel therealong; and a spring having a first end in contact with said diaphragm and a second end in contact with said bushing for providing operational bias for said diaphragm against the flow of a gas to be regulated through said regulator, the travel of said bushing varying the compression of said spring and the operational bias for said diaphragm, said ring of said shaft being biased by said spring into contact with a lower surface of said top wall to journal said shaft for rotation, the lower threaded portion of said shaft having a stop at a lower end thereof to prevent said bushing from becoming unthreaded from said shaft.

* * * * *